United States Patent
Wick et al.

(10) Patent No.: US 9,189,607 B1
(45) Date of Patent: Nov. 17, 2015

(54) MOBILE PHONE CONTROLS PREPROCESSOR

(71) Applicant: Sprint Communications Company L.P., Overland Park, KS (US)

(72) Inventors: Ryan A. Wick, Apollo Beach, FL (US); Nathan R. Smith, Frisco, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/476,339

(22) Filed: Sep. 3, 2014

Related U.S. Application Data

(62) Division of application No. 13/537,610, filed on Jun. 29, 2012, now Pat. No. 8,843,122.

(51) Int. Cl.
| | |
|---|---|
| *H04M 3/00* | (2006.01) |
| *G06F 21/10* | (2013.01) |
| *H04L 29/06* | (2006.01) |
| *H04W 12/08* | (2009.01) |

(52) U.S. Cl.
CPC ............... *G06F 21/10* (2013.01); *H04L 63/10* (2013.01); *H04W 12/08* (2013.01)

(58) Field of Classification Search
CPC ..... H04W 12/12; H04W 12/06; H04W 64/00; H04W 4/02; H04W 48/04; H04W 8/245; H04L 63/20; H04L 63/08; G06F 11/3466
USPC ...................... 455/456.1–457, 410–411, 418; 726/1–2, 26–30; 717/127
See application file for complete search history.

(56) References Cited

U.S. PATENT DOCUMENTS

| | | |
|---|---|---|
| 5,950,200 A | 9/1999 | Sudai et al. |
| 6,064,975 A | 5/2000 | Moon et al. |
| 6,186,553 B1 | 2/2001 | Phillips et al. |
| 6,356,838 B1 | 3/2002 | Paul |
| 6,622,016 B1 | 9/2003 | Sladek et al. |
| 6,647,260 B2 | 11/2003 | Dusse et al. |

(Continued)

FOREIGN PATENT DOCUMENTS

| | | |
|---|---|---|
| WO | WO2009056148 A2 | 5/2009 |
| WO | WO2014022446 A1 | 2/2014 |

OTHER PUBLICATIONS

Final Office Action dated May 18, 2015, U.S. Appl. No. 13/659,889, filed Oct. 24, 2012.

(Continued)

*Primary Examiner* — Steve D Agosta

(57) ABSTRACT

A method of policy management and control on a mobile phone. The method comprises receiving a user interface change request by a launcher application executing on the mobile phone, requesting permissions from an interface control application programming interface (API) by the launcher application, receiving a response from the interface control application programming interface by the launcher application, where the response indicates if the user interface change is permitted, and enforcing the received permission by the launcher application, where enforcing the received permission comprises executing the user interface change request when the user interface change is permitted, and where enforcing the received permissions comprises not executing the user interface change request and presenting a message to a user of the mobile phone when the user interface change is restricted.

5 Claims, 8 Drawing Sheets

(56) References Cited

U.S. PATENT DOCUMENTS

| | | |
|---|---|---|
| 6,978,132 B1 | 12/2005 | Sladek et al. |
| 6,986,107 B2 | 1/2006 | Hanggie et al. |
| 7,031,437 B1 | 4/2006 | Parsons et al. |
| 7,072,653 B1 | 7/2006 | Sladek et al. |
| 7,073,130 B2 | 7/2006 | Novak et al. |
| 7,215,754 B1 | 5/2007 | Woodson et al. |
| 7,260,382 B1 | 8/2007 | Lamb et al. |
| 7,260,386 B1 | 8/2007 | Haldar et al. |
| 7,500,198 B2 | 3/2009 | Mathews et al. |
| 7,558,953 B2 | 7/2009 | Osthoff et al. |
| 7,702,322 B1 | 4/2010 | Maurya et al. |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,150,962 B1 | 4/2012 | Wolter |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,583,091 B1 | 11/2013 | Delker et al. |
| 8,589,911 B1 | 11/2013 | Sharkey et al. |
| 8,819,639 B2 * | 8/2014 | Schumacher ................ 717/127 |
| 8,838,087 B1 | 9/2014 | Delker et al. |
| 8,843,122 B1 | 9/2014 | Wick et al. |
| 8,863,232 B1 * | 10/2014 | Tidd ................ 726/2 |
| 8,954,041 B1 | 2/2015 | Delker et al. |
| 8,972,592 B1 | 3/2015 | Delker et al. |
| 9,043,446 B1 | 5/2015 | Davis et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0113940 A1 * | 6/2004 | Brockway et al. ............ 345/741 |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0055696 A1 | 3/2005 | Betzler et al. |
| 2005/0071780 A1 | 3/2005 | Muller et al. |
| 2005/0085272 A1 | 4/2005 | Anderson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0150256 A1 * | 7/2006 | Fanton et al. ................ 726/27 |
| 2006/0190569 A1 | 8/2006 | Neil et al. |
| 2006/0258289 A1 | 11/2006 | Dua |
| 2006/0277469 A1 | 12/2006 | Chaudhri et al. |
| 2007/0067738 A1 | 3/2007 | Flynt et al. |
| 2007/0088851 A1 | 4/2007 | Levkovitz et al. |
| 2007/0109580 A1 | 5/2007 | Yoshida |
| 2007/0130156 A1 | 6/2007 | Tenhunen et al. |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1 | 1/2008 | Pyhalammi et al. |
| 2008/0034309 A1 | 2/2008 | Louch et al. |
| 2008/0092057 A1 | 4/2008 | Monson et al. |
| 2008/0192714 A1 | 8/2008 | Kim et al. |
| 2008/0214172 A1 | 9/2008 | Anwer |
| 2008/0276182 A1 | 11/2008 | Leow |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0077495 A1 | 3/2009 | Bhat et al. |
| 2009/0181716 A1 | 7/2009 | Benco et al. |
| 2009/0186651 A1 | 7/2009 | You |
| 2009/0228824 A1 | 9/2009 | Forstall et al. |
| 2009/0254753 A1 | 10/2009 | De Atley et al. |
| 2009/0260004 A1 | 10/2009 | Datta et al. |
| 2009/0291674 A1 | 11/2009 | Choi |
| 2009/0307679 A1 | 12/2009 | Lee et al. |
| 2010/0005196 A1 | 1/2010 | Wolff-Petersen |
| 2010/0030901 A1 | 2/2010 | Hallberg et al. |
| 2010/0037204 A1 | 2/2010 | Lin et al. |
| 2010/0058431 A1 * | 3/2010 | McCorkendale et al. ........ 726/1 |
| 2010/0060549 A1 | 3/2010 | Tsern |
| 2010/0087175 A1 | 4/2010 | Roundtree |
| 2010/0115438 A1 | 5/2010 | Chu |
| 2010/0184422 A1 | 7/2010 | Ahrens |
| 2010/0190478 A1 | 7/2010 | Brewer et al. |
| 2010/0197219 A1 | 8/2010 | Issa et al. |
| 2010/0234051 A1 | 9/2010 | Holden et al. |
| 2010/0281427 A1 | 11/2010 | Ghosh et al. |
| 2011/0072121 A1 | 3/2011 | Takasugi et al. |
| 2011/0161149 A1 | 6/2011 | Kaplan |
| 2011/0161484 A1 | 6/2011 | Van den Bogaert et al. |
| 2011/0210933 A1 | 9/2011 | Forstall |
| 2011/0238496 A1 | 9/2011 | Gurbuxani et al. |
| 2011/0295980 A1 | 12/2011 | Aldis et al. |
| 2011/0314389 A1 | 12/2011 | Meredith et al. |
| 2012/0016735 A1 | 1/2012 | Park et al. |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2013/0097654 A1 * | 4/2013 | Aciicmez et al. ................ 726/1 |
| 2013/0275915 A1 | 10/2013 | Wang |
| 2014/0036697 A1 | 2/2014 | Annan Brandon C. et al. |
| 2014/0047559 A1 | 2/2014 | Vera Nicolas et al. |
| 2014/0127662 A1 | 5/2014 | Kron et al. |
| 2014/0173462 A1 | 6/2014 | Mattingly et al. |

OTHER PUBLICATIONS

Notice of Allowance dated Apr. 22, 2015, U.S. Appl. No. 13/031,123, filed Feb. 18, 2011.

Schwermann, Nathan M., et al., entitled "Methods for Customization of Default Applications on a Mobile Communication Device," filed Apr. 30, 2015, U.S. Appl. No. 14/701,156.

Office Action dated Aug. 15, 2011, U.S. Appl. No. 12/330,759, filed Dec. 9, 2008.

Office Action dated Apr. 3, 2008, U.S. Appl. No. 11/333,964, filed Jan. 17, 2006.

Final Office Action dated Oct. 8, 2008, U.S. Appl. No. 11/333,964, filed Jan. 17, 2006.

Final Office Action dated Jan. 21, 2009, U.S. Appl. No. 11/333,964, filed Jan. 17, 2006.

Advisory Action dated Apr. 13, 2009, U.S. Appl. No. 11/333,964, filed Jan. 17, 2006.

Office Action dated Jun. 23, 2009, U.S. Appl. No. 11/333,964, filed Jan. 17, 2006.

Final Office Action dated May 11, 2010, U.S. Appl. No. 11/333,964, filed Jan. 17, 2006.

Advisory Action dated Jul. 22, 2010, U.S. Appl. No. 11/333,964, filed Jan. 17, 2006.

Wolter, Eric, Patent Application entitled "Method and System for Calendar-Based Delivery of Themed User-Interface Skins," filed Dec. 9, 2008, U.S. Appl. No. 12/330,759.

Delker, Jason R., et al., Patent Application entitled "System and Method for ID Platform," filed Sep. 5, 2013, U.S. Appl. No. 14/019,053.

Delker, Jason R., et al., Patent Application entitled "Dynamic Loading, Unloading, and Caching of Alternate Complete Interfaces," filed Sep. 30, 2013, U.S. Appl. No. 14/042,707.

Delker, Jason R., et al., Patent Application entitled "Shared ID with Second Party," filed Jan. 31, 2011, U.S. Appl. No. 13/018,083.

Delker, Jason R., et al., Patent Application entitled "Extending ID to a Computer System," filed May 27, 2011, U.S. Appl. No. 13/118,058.

(56) References Cited

OTHER PUBLICATIONS

Davis, John M., et al., Patent Application entitled "Mirroring Device Interface Components for Content Sharing," filed Mar. 10, 2011, U.S. Appl. No. 13/045,292.
Katzer, Robin Dale, et al., Patent Application entitled "Zone Architecture for Dynamic Targeted Content Creation," filed Oct. 11, 2011, U.S. Appl. No. 13/271,207.
Delker, Jason R., et al., Patent Application entitled "Transition Experience During Loading and Updating an Interface and Applications Pack," filed Oct. 24, 2012, U.S. Appl. No. 13/659,889.
Delker, Jason R., et al., Patent Application entitled "Ad Sponsored Communication Pack," filed Feb. 18, 2011, U.S. Appl. No. 13/031,123.
Foreign Communication From a Related Counterpart Application—International Preliminary Report on Patentability dated Feb. 12, 2015, PCT/US2013/052805 filed on Jul. 24, 2013.
Supplemental Notice of Allowance dated Dec. 3, 2014, U.S. Appl. No. 13/118,058, filed May 27, 2011.
Notice of Allowance dated Jan. 6, 2015, U.S. Appl. No. 13/045,292, filed Mar. 10, 2011.
Office Action dated Dec. 17, 2014, U.S. Appl. No. 13/563,709, filed Jul. 31, 2012.
FAIPP Office Action dated Dec. 2, 2014, U.S. Appl. No. 13/271,207, filed Oct. 11, 2011.
Ackerman, Samuel K, "Lecture Slides: Mapping User Interface Design to Culture Dimensions", Aaron Marcus and Associates, Inc., 2001.
Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.
Kenja's Newsletter, About Newsletter, http://kenja.net/news.main.html, printed from the World Wide Web, "last modified Fri, Oct. 10, 2003".
Openwave, "Comparison of WAP Push and Short Message Service (SMS)," Openwave Systems, Inc., Redwood City, CA, Apr. 2002.
Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Foreign Communication From a Related Counterpart Application—International Search Report and Written Opinion, PCT/US2013/052805 Oct. 4, 2013.
Pre-Interview Communication dated Apr. 24, 2012, U.S. Appl. No. 12/876,220, filed Sep. 6, 2010.
FAIPP Office Action dated Jan. 24, 2014, U.S. Appl. No. 12/876,220, filed Sep. 6, 2010.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Pre-Interview Communication dated Feb. 26, 2013, U.S. Appl. No. 13/023,486, filed Feb. 8, 2011.
Notice of Allowance dated Jun. 4, 2013, Application U.S. Appl. No. 13/023,486, filed Feb. 8, 2011.
Pre-Interview Communication dated Mar. 28, 2014, U.S. Appl. No. 14/019,053 filed Sep. 5, 2013.
Notice of Allowance dated Aug. 13, 2014, U.S. Appl. No. 14/019,053, filed Sep. 5, 2013.
Office Action—Restriction Requirement dated Feb. 1, 2012, U.S. Appl. No. 12/876,221, filed Sep. 6, 2010.
Office Action dated May 10, 2012, U.S. Appl. No. 12/876,221, filed Sep. 6, 2010.
Final Office Action dated Jan. 11, 2013, U.S. Appl. No. 12/876,221, filed Sep. 6, 2010.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Pre-Interview Communication dated Jul. 19, 2012, U.S. Appl. No. 13/018,083, filed Jan. 31, 2011.
Final Office Action dated May 10, 2013, U.S. Appl. No. 13/018,083, filed Jan. 31, 2011.
Advisory Action dated Aug. 6, 2013, U.S. Appl. No. 13/018,083, filed Jan. 31, 2011.
Office Action dated Dec. 26, 2013, U.S. Appl. No. 13/018,083, filed Jan. 31, 2011.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Sep. 23, 2014, U.S. Appl. No. 13/018,083, filed Jan. 31, 2011.
Pre-Interview Communication dated Feb. 26, 2013, U.S. Appl. No. 13/118,058, filed May 27, 2011.
First Action Interview Office Action dated May 6, 2013, U.S. Appl. No. 13/118,058, filed May 27, 2011.
Final Office Action dated Sep. 10, 2013, U.S. Appl. No. 13/118,058, filed May 27, 2011.
Advisory Action dated Nov. 22, 2013, U.S. Appl. No. 13/118,058, filed May 27, 2011.
Office Action dated Mar. 18, 2014, U.S. Appl. No. 13/118,058, filed May 27, 2011.
Notice of Allowance dated Oct. 22, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Pre-Interview Communication dated Jun. 9, 2014, U.S. Appl. No. 13/271,207, filed Oct. 11, 2011.
Notice of Allowance dated Mar. 30, 2012, U.S. Appl. No. 13/029,103, filed Feb. 16, 2011.
Notice of Allowance dated Apr. 29, 2013, U.S. Appl. No. 13/537,563, filed Jun. 29, 2012.
Office Action dated Mar. 14, 2013, U.S. Appl. No. 13/161,496, filed Jun. 16, 2011.
Notice of Allowance dated Jun. 27, 2013, U.S. Appl. No. 13/161,496, filed Jun. 16, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Pre-Interview Communication dated Aug. 8, 2014, U.S. Appl. No. 13/659,889, filed Oct. 24, 2012.
First Action Interview dated Oct. 15, 2014, U.S. Appl. No. 13/659,889, filed Oct. 24, 2012.
Office Action—Restriction Requirement dated Aug. 26, 2013, U.S. Appl. No. 13/031,123, filed Feb. 18, 2011.
Office Action dated Dec. 17, 2013, U.S. Appl. No. 13/031,123, filed Feb. 18, 2011.
Office Action dated Oct. 10, 2014, U.S. Appl. No. 13/031,123, filed Feb. 18, 2011.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Final Office Action dated Jun. 23, 2015, U.S. Appl. No. 13/563,709, filed Jul. 31, 2012.
Final Office Action dated Jun. 4, 2015, U.S. Appl. No. 13/271,207, filed Oct. 11, 2011.
Advisory Action dated Jul. 27, 2015, U.S. Appl. No. 13/659,889, filed Oct. 24, 2012.

* cited by examiner

MOBILE PHONE CONTROLS PREPROCESSOR

CROSS-REFERENCE TO RELATED APPLICATIONS

This application is a divisional of and claims priority under 35 U.S.C. §120 to U.S. patent application Ser. No. 13/537,610, filed on Jun. 29, 2012, entitled "Mobile Phone Control Preprocessor," by Ryan A. Wick, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Policy management is an approach for delivering wireless services to mobile communication devices, with the focus on open interfaces across the service delivery chain. Digital rights management (DRM) is an access control technology used by hardware manufacturers, publishers, copyright holders and individuals with the intent to limit the use of digital content. Digital rights management is any technology that inhibits uses of digital content that are not desired or intended by the content provider. Common digital rights management techniques include encryption, scrambling, and the embedding of a tag.

SUMMARY

In an embodiment, a method of policy management and control on a mobile phone is disclosed. The method comprises receiving a user interface change request by a launcher application executing on the mobile phone, requesting permissions from an interface control application programming interface (API) by the launcher application, receiving a response from the interface control application programming interface by the launcher application, where the response indicates if the user interface change is permitted, and enforcing the received permission by the launcher application, where enforcing the received permission comprises executing the user interface change request when the user interface change is permitted, and where enforcing the received permissions comprises not executing the user interface change request and presenting a message to a user of the mobile phone when the user interface change is restricted.

In an embodiment, a method of policy management and control on a mobile phone is disclosed. The method comprises receiving a settings change request by a settings application executing on the mobile phone, requesting permissions from an interface control application programming interface (API) by the settings application, receiving a response from the interface control application programming interface by the settings application, where the response indicates if the settings change is permitted, and enforcing the received permission by the settings application, where enforcing the received permission comprises executing the settings change request when the settings change is permitted, and where enforcing the received permissions comprises not executing the settings change request and presenting a message to a user of the mobile phone when the settings change is restricted.

In an embodiment, a method of policy management and control on a mobile phone is disclosed. The method comprises receiving an interface and applications pack (IAP) change request by an interface and applications pack installer application executing on the mobile phone, requesting permissions from an interface control application programming interface (API) by the interface and applications pack installer application, receiving a response from the interface control application programming interface by the interface and applications pack installer application, where the response indicates if the interface and applications pack change is permitted, and enforcing the received permission by the interface and applications pack installer application, where enforcing the received permission comprises executing the interface and applications pack change request when the interface and applications pack change is permitted, and where enforcing the received permissions comprises not executing the interface and applications pack change request and presenting a message to a user of the mobile phone when the interface and applications pack change is restricted.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
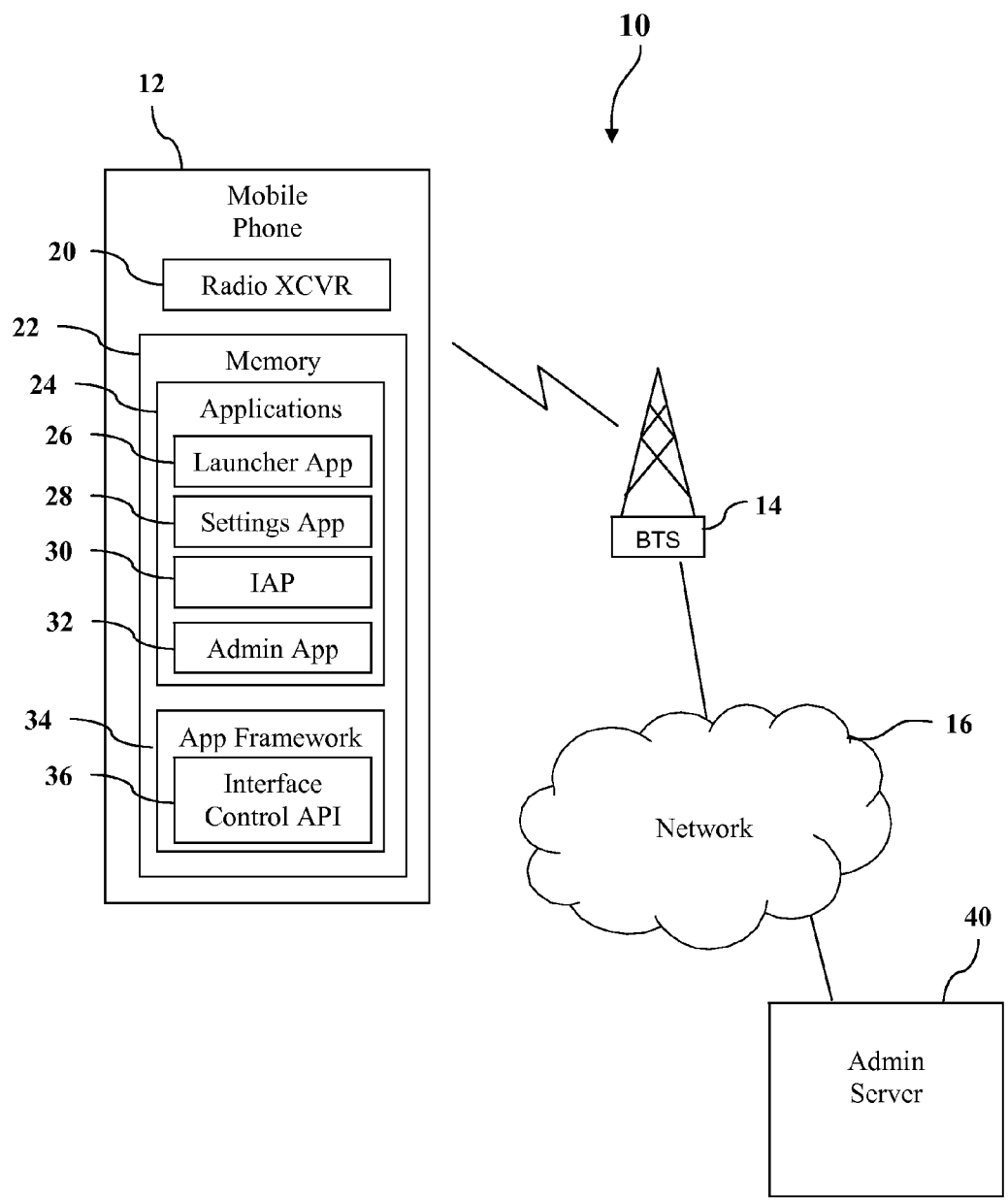
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Modern mobile smartphones provide users with a myriad of options for customizing their device, from altering the look and feel of the user interface to adding functionality with new applications. While this increased power and flexibility can increase satisfaction for the user, it can pose problems in an enterprise environment where a company may want to limit what their employees do on company purchased equipment. The present disclosure presents methods for restricting changes on a mobile phone and for remote administration of the mobile phone in an enterprise environment.

A system and method of policy management and control on a mobile phone is disclosed, comprising an interface control application programming interface which provides access to permissions for user interface configuration, device settings, and interface and applications pack configuration. This is accomplished through implementation of modified applications which interact with the interface control application programming interface prior to performing actions requested by the user.

A launcher application presents the home screen or main view of the mobile phone and is responsible for starting other applications and hosting widgets. A widget is a small, dynamic application that provides a graphical element which may display live data, such as the current time or temperature. A modified launcher application is installed on the mobile phone which interacts with the interface control application programming interface to check permissions each time a user attempts to perform an action. If the user is not allowed by the defined permissions to perform the action, a message is presented to the user explaining the blocked permissions. Permissions that may be enforced by the launcher application may include adding, deleting, or moving a user interface element, changing wallpaper, invoking a search, and opening the settings menu.

Similarly, the settings application may be modified to interact with the interface control application programming interface to check permissions when a user attempts to configure their device via the settings menu. Permissions may be checked for settings such as toggling radios on and off, adding accounts such as email or social networks, updating firmware, and deleting applications. When a user attempts to modify these types of settings by clicking on an item such as a list, checkbox, or dropdown, the settings application checks permissions with the interface control application programming interface. If the user is not allowed by the defined permissions to perform the action, the settings application enforces the permissions by presenting a message to the user explaining the blocked permissions.

In addition to limiting user interface changes through the launcher application and configuration changes through the settings application, the interface control application programming interface may also provide support to control changes to interface and applications packs. An interface and applications pack comprises at least one of a media file, an application, a web widget, and a network service and may be viewed as an aggregated set of targeted content used to customize the communication experience of using an electronic device. The interface and applications pack may be produced by an enterprise such as a retail outlet or a media business to promote its business interests to wireless communication service subscribers.

Users may install multiple interface and applications packs on their phone and switch between them to change the look of the phone screens and provide accessibility to applications in the interface and applications pack. The interface and applications pack installer application may also be designed to interact with the interface control application programming interface. When a user attempts to change the user interface of the interface and applications pack or add or delete an application in the interface and applications pack, the interface and applications pack installer application checks permissions with the interface control application programming interface. If the user is not allowed by the defined permissions to perform the attempted change, the interface and applications pack installer application enforces the permissions and presents a message to the user explaining the blocked permissions.

The interface control application programming interface also supports remote configuration and control of the mobile phone through an administration application on the phone designed to interact with the interface control application programming interface. The administration application allows remote access to the mobile phone through an administration server which can query the phone for its current settings and installed applications. Once the administration server has a snapshot of the phone configuration, a device administrator may make changes to the permissions and applications for the device on the administration server and push the updated permissions and applications to the mobile phone without user interaction. This remote configuration capability may allow the device administrator to add and remove applications on the mobile phone to ensure the enterprise user has the functionality needed while limiting access to unnecessary or personal content.

In an embodiment, the permissions may be contextually defined. For example, depending on the context or environment, the permissions may be different. During working hours, when the mobile phone may be used in an enterprise environment, a first set of permissions defined and/or approved by the enterprise may be applicable and referenced by the settings application during working hours, while when the mobile phone is used in a private capacity by the user, a second set of permissions defined by the subscriber may be applicable and referenced by the settings application. The context may be distinguished based on time of day, day of week, geographical location, and/or relative location. The context may be distinguished by whether the mobile phone is used in a company vehicle or whether the mobile phone is embedded in a company vehicle or removed from the company vehicle. The context may be distinguished based on whether the location of the mobile phone is in town or out of town. The context may be distinguished based on other states.

The context based permissions described above may relate to a selected number of the configurable mobile phone parameters, applications, or settings. For example, the context based permissions may be restricted to settings for camera operability, GPS operability, web browser limitations. In an embodiment, the settings application may evaluate the state of settings during a context transition and change settings based on the context based permissions of the impending context. For example, shortly before working hours begin, the settings application may impose web browser site restrictions, turn on the GPS functionality, and disable camera operability, notwithstanding what these settings may have been when the out-of-office context was active. In an embodiment, context specific settings may be stored separately in the mobile phone to support automatic restoral of context specific settings when transitioning to the subject context. Some settings may not be subject to change based on context. For example, an enterprise permission or rule that forbids installing applications and/or games from unapproved third party vendors may remain in force even when the context shifts to the out-of-office context, to avoid a disabling virus being installed on the mobile phone.

Turning now to FIG. 1, a system 10 for policy management and control on a mobile phone is described. In an embodiment, the system 10 comprises a mobile phone 12, a base transceiver station 14, a network 16, and an administration server 40. The mobile phone 12 comprises a radio transceiver 20 and a memory 22. The memory 22 of the mobile phone 12 comprises an applications layer 24 and an application framework layer 34 comprising an interface control application programming interface 36. The applications layer 24 comprises a launcher application 26, a settings application 28, an interface and applications pack installer application 30, and an administration application 32.

In an embodiment, the launcher application 26 interacts with the interface control application programming interface 36 to request permissions when a user attempts to make a change to the user interface of the mobile phone 12. Permissions which may be enforced by the launcher application 26 may include blocking the ability to add a widget/shortcut/folder, to delete a widget/shortcut/folder, to move a widget/shortcut/folder, to drag a widget/shortcut/folder to another panel, to resize a widget, to change wallpaper, to invoke search from a menu or physical button, to open the settings menu, and to long-press an icon in the applications tray and have it added to a panel.

In an embodiment, the settings application 28 interacts with the interface control application programming interface 36 to request permissions when a user attempts to make a change to the configuration settings of the mobile phone 12. The settings application 28 may include in excess of 100 values a user can configure and may check and enforce permissions on one or more of the values. Permissions which may be enforced by the settings application 28 may include blocking the ability to toggle the global positioning system (GPS) on/off, to toggle the Wi-Fi on/off, to configure the Wi-Fi access point, to modify the Wi-Fi access point, to delete the Wi-Fi access point, to configure virtual private network (VPN) connections, to modify virtual private network connections, to add virtual private network connections, to add accounts such as email or social networks, to update firmware, to perform factory resets, to wipe secure digital (SD) card data, to delete applications, and to stop applications and clear their internal data.

In an embodiment, the interface and applications pack installer application 30 interacts with the interface control application programming interface 36 to request permissions when a user attempts to make changes to the interface and applications pack user interface or content. Permissions may be defined by the designer of the interface and applications pack. Permissions which may be enforced by the settings application 28 may include blocking the ability to modify the user interface of an interface and applications pack, to add applications to an interface and applications pack, to delete applications from an interface and applications pack, and to change the wallpaper of the interface and applications pack.

The mobile phone 12, while shown as a mobile phone, may be a personal digital assistant (PDA), a media player, or other network enabled electronic device. The base transceiver station 14 provides a communication link to the radio transceiver 20 and couples the mobile phone 12 to the network 16. In an embodiment, the base transceiver station 14 provides a wireless communication link to the radio transceiver 20 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the system 10 may comprise any number of base transceiver stations 14. The network 16 may be a public communication network, a private communication network, or a combination thereof. The network 16 may be a combination of a wireless network coupled to a wired network, where the wireless network is provided by a wireless service provider and accessed via a plurality of base transceiver stations 14.

The administration server 40 is coupled to the network 16 and interfaces with the mobile phone 12 via the network 16. The administration server 40 facilitates remote access to the mobile phone 12 by a device administrator. In an enterprise environment, a company may want to maintain control over mobile phones 12 purchased by the company for their employees to provide consistent functionality and user interfaces across the enterprise devices. The device administrator is responsible for configuration of the enterprise devices and may interact with the devices directly through an administration application 32 installed on the mobile phone 12. The administration application 32 interfaces with the interface control application programming interface 36 to read and write permissions to control the configuration of the mobile phone 12. The administration application 32 may be provided by a third party vendor and may pay a license fee to obtain special permission to access the interface control application programming interface 36.

Alternatively, the device administrator may interact with the enterprise devices through the administration server 40. The administration server 40 may interact with the mobile phone 12 through the administration application 32. The device administrator may query the mobile phone 12 for its current status via the administration server 40, where a snapshot of the current status may include the current settings and a list of installed applications. The snapshot of the mobile phone 12 status may be stored on the administration server 40. Once the snapshot of the mobile phone 12 resides on the administration server 40, the device admin may make changes to the configuration settings identified in the snapshot and then push the changes to the mobile phone 12 without user interaction. In an embodiment, the administration server may query the mobile phone 12 periodically, for instance nightly or weekly, to keep the stored status snapshot up to date.

The current status for the mobile phone 12 stored on the administration server 40 may comprise the list of installed applications. The device administrator, via the administration server 40, is allowed to add applications, remove applications, and push updates to applications remotely without user interaction. The user interface of the mobile phone 12 may be impacted by the updates, such as adding or removing an application from the home screen. Upon receiving the updates, the interface control application programming interface 36 notifies the launcher application 26. The launcher application 26 responds by calling the interface control application programming interface 36 to check permissions, and then rebuilding the launcher screens based on the updated configuration.

The mobile phone 12 may be configured to allow the user to have the ability to install applications themselves, in addition to the device administrator. In an embodiment, the administration server 40 includes support for white lists and black lists for the mobile device 12 to ensure that user installed applications do not interfere with the enterprise functionality of the device. A white list may comprise a list of applications that have been approved by the company and are thought not to cause any issues when installed alongside the enterprise applications. When the administration server 40 receives the status snapshot for the mobile phone 12, including the list of installed applications, the installed applications that are on the white list are allowed to remain in the snapshot and on the mobile phone 12. A black list may comprise a list of applications that are not approved by the company and are not allowed on their enterprise devices. The administration server 40 checks the status snapshot for the mobile phone 12, and any installed applications that are on the blacklist are removed from the snapshot, and a remote update is sent to the mobile phone 12 to remove the blacklisted applications.

In an embodiment, the application server 40 may also configure a uniform resource locator (URL) pointing to a private application store to securely deliver applications for the enterprise. The uniform resource locator is a reference to an Internet resource, and may point to the company's enterprise network or a hosting facility to provide a list of applications in the private store. The user can select applications from the list of applications to download and install on the mobile phone 12.

In an embodiment, the mobile phone 12 may come configured with standard applications installed as part of the operating system which are not able to be removed by the user, such as a mail program, an application store, and an Internet browser. The device administrator may be able to remotely disable these applications via the applications server 40 to provide the enterprise more control over the mobile phone 12. Disabling the applications does not remove them, but from the system and user perspective the applications are not installed.

Figure 2:
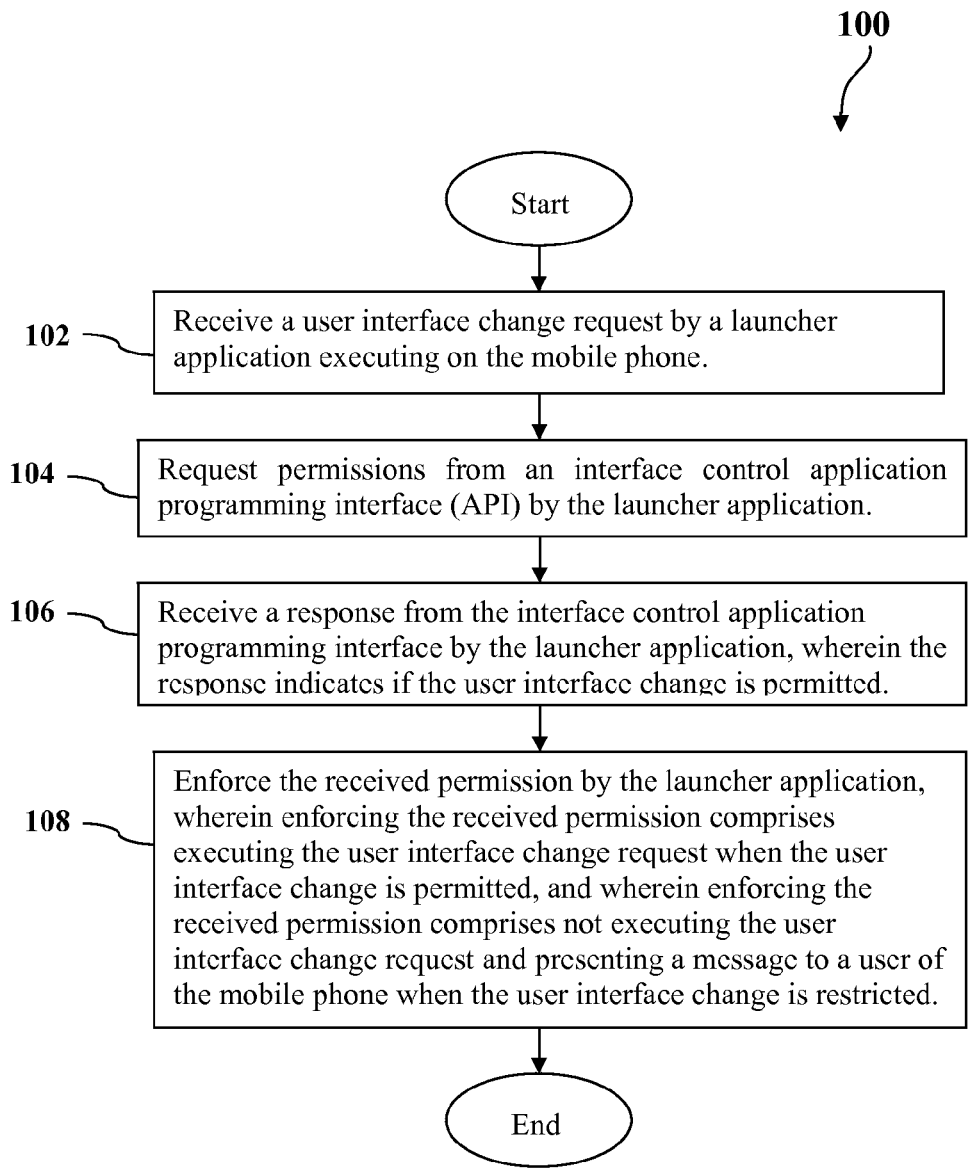
FIG. 2 is a flow chart of a method according to an embodiment of the disclosure.

Turning now to FIG. 2, a method 100 of policy management and control on a mobile phone 12 is described. At block 102, a user interface change request is received by a launcher application 26 executing on the mobile phone 12. The launcher application 26 is the application that constructs the home screen and presents it to the user of the mobile phone 12. The change request may be in response to the user interacting with a touch screen of the mobile phone 12 or accessing a menu on the mobile phone 12 to attempt to alter the appearance of the home screen. At block 104, the launcher application 26 requests permissions from an interface control application programming interface 36. The permissions define which user interface changes are allowed and are used to control the look and functionality of the home screen on the mobile device 12. At block 106, the launcher application 26 receives a response from the interface control application programming interface 36, where the response indicates if the user interface change is permitted. The interface control application programming interface 36 replies to the permissions check with a true or false indication notifying the launcher application 26 whether to allow the user interface change. At block 108, the launcher application enforces the received permission, where enforcing the received permission comprises executing the user interface change request when the user interface change is permitted, and where enforcing the received permission comprises not executing the user interface change request and presenting a message to a user of the mobile phone 12 when the user interface change is restricted. In one implementation, if the launcher application 26 receives a response of false, this indicates the user interface change requested is not disabled, and the launcher application 26 executes to complete the user interface change. A response of true indicates the user interface change requested is disabled, and the launcher application 26 does not execute the user interface change and instead presents a message to the user of the mobile phone 12 to inform the user that the user interface change attempted is not allowed. The true/false logic could be implemented differently in other embodiments.

In an embodiment, the user interface change comprises one of adding, deleting, or rearranging user interface elements, where user interface elements comprise shortcuts, widgets, and folders. User interface elements are the individual components displayed on the screen together to make up the user interface. A shortcut is a link to an application, where clicking on the shortcut executes the application. A widget is a small, dynamic application that provides a graphical element which may display live data, such as the current time or temperature. A folder is a reference to a grouping of other elements or to a location on the file system of the mobile phone 12. These user interface elements can be added, deleted, or rearranged on the screen to change the appearance and functionality of the mobile phone 12.

In an embodiment, the user interface comprises one or more panels, where a panel comprises a plurality of cells. The home screen is an example of a panel, being the primary screen visible when the mobile phone 12 is turned on. The user interface will comprise at least the one panel of the home screen, but may also comprise additional panels, typically accessed by swiping across the touch screen from one side to the other. Each panel may comprise user interface elements to present a unique look and functionality when the panel is active. Each panel is divided into rows and columns of cells. For example, a panel may be made up of sixteen cells, four rows of cells down by four columns of cells across.

In an embodiment, the permissions are based on one of a panel location or a cell location on the user interface. The user interface elements may be defined by location on the mobile phone 12, with the location specified by a panel number and a cell number. For example, a widget for displaying the time may be located on panel 1 at cell 2. When the user of the mobile phone 12 attempts to move the widget, the launcher application 26 checks with the interface control application programming interface 36 for the permissions for that location. In an embodiment, the permissions are based on a user interface element. In this case, the permissions are tied to the element itself rather than the location of the element. When the user of the mobile phone 12 attempts to move the element, the launcher application 26 checks with the interface control application programming interface 36 for the permissions for that user interface element instead of checking permissions for the location of the element.

In an embodiment, the user interface elements occupy one or more cells on the panel. User interface elements may vary in size based on the type of element and the functionality of the element. For example, a shortcut or folder may occupy a single cell on the panel, as they are static and all that needs to be displayed is an icon and a name for the element. A widget may occupy multiple cells or even the whole panel based on the amount of information the widget is providing or the desired visibility of the information. In an embodiment, rearranging the user interface elements comprises moving the user interface element to another panel. In addition to moving the user interface element to another location on the same panel, the user interface element may also be moved between panels. This allows user interface elements to be freely moved around without being locked to the panel where they were originally installed.

In an embodiment, the method 100 further comprises pushing initial permissions and updates to permissions to the launcher application 26 from the interface control application programming interface 36. Pushing the permissions to the launcher application 26 would allow the launcher application 26 to more quickly respond to user interface change requests. The launcher application 26 would not need to check with the interface control application programming interface 36 for permissions as it would have them stored internally.

Figure 3:
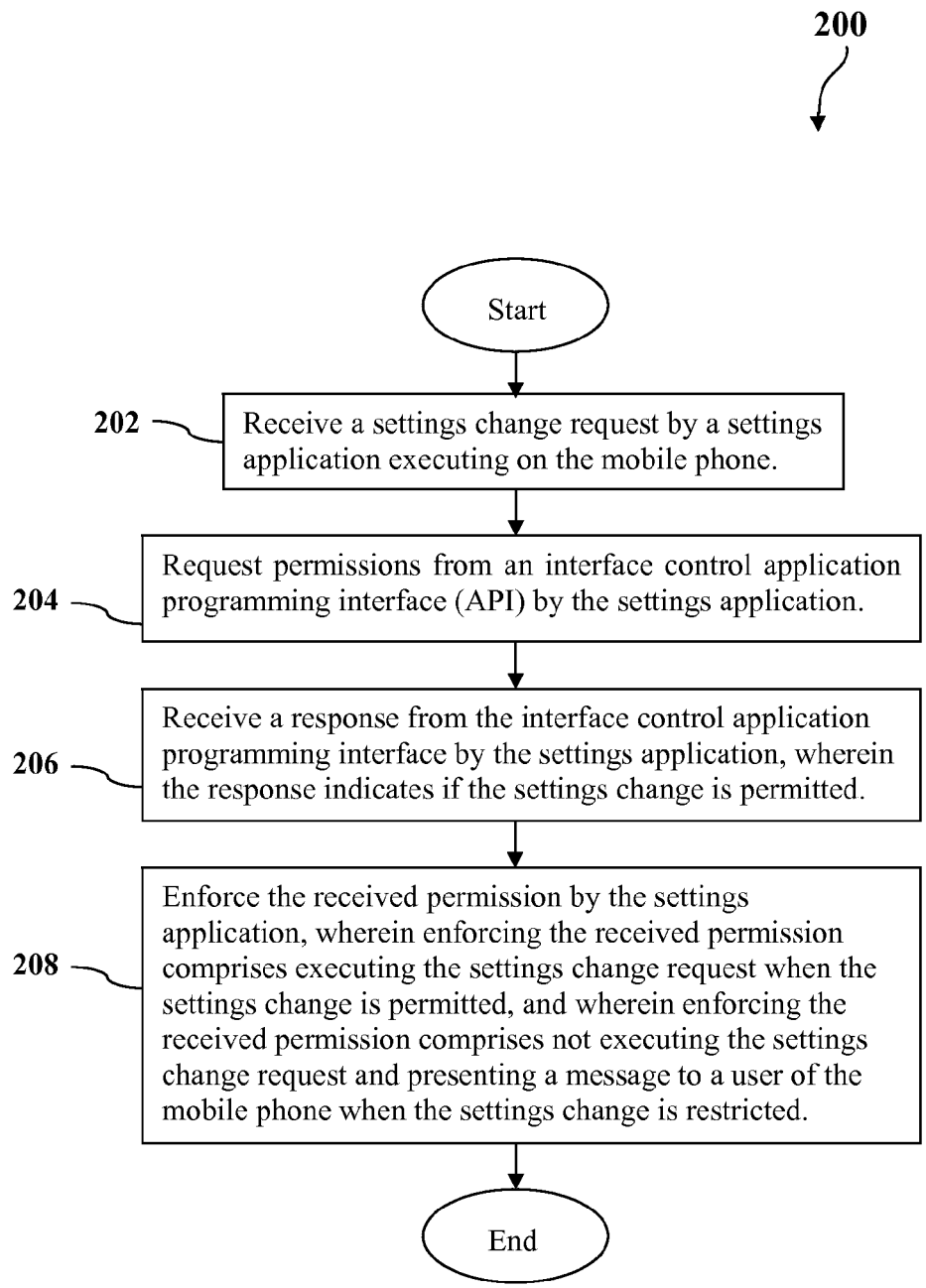
FIG. 3 is a flow chart of a method according to an embodiment of the disclosure.

Turning now to FIG. 3, a method 200 of policy management and control on a mobile phone is described. At block 202, a settings change request is received by a settings application 28 executing on the mobile phone 12. The settings application 28 is used to configure global system level preferences. The settings change request may be in response to the user executing the settings application 28 and attempting to make a configuration change to the mobile phone 12. At block 204, the settings application 28 requests permissions from an interface control application programming interface 36. The permissions define which settings changes are allowed and are used to control the configuration of the mobile phone 12. At block 206, the settings application 28 receives a response from the interface control application programming interface 36, where the response indicates if the settings change is permitted. The interface control application programming interface 36 replies to the permissions check with a true or false indication notifying the settings application 28 whether to allow the configuration change. At block 208, the settings application 28 enforces the received permission, where enforcing the received permission comprises executing the settings change request when the settings change is permitted, and where enforcing the received permission comprises not executing the settings change request and presenting a message to a user of the mobile phone 12 when the settings change is restricted.

In an embodiment, the settings change comprises selecting an item in the settings application 28 such as a list, checkbox, or dropdown. The settings application 28 may provide a plurality of types of user interface selections for different configuration screens. One setting may provide a list of choices to select, while another setting may provide a checkbox to toggle the setting on and off, and a third setting may provide a dropdown menu for selection. The settings application recognizes the selection of the configuration change from each of the different user interface types.

In an embodiment, the method 200 further comprises a device administrator remotely accessing the interface control application programming interface 36 to configure the mobile phone settings. In an enterprise environment the device administrator may be responsible for the configuration and control of company owned devices. The device administrator may want to configure the mobile phone 12 remotely instead of having the user configure settings. Providing remote access to the permissions via the interface control application programming interface 36 allows the device administrator to configure the mobile phone 12 settings without user interaction.

In an embodiment, remotely accessing the interface control application programming interface 36 comprises interfacing with an application running on the mobile phone 12 with permission to access the interface control application programming interface 36. Opening up remote access to the interface control application programming interface 36 may introduce security concerns. Executing an application on the mobile phone 12 with access rights to the interface control application programming interface 36 may prevent a security attack from a remote location affecting the configuration of the mobile phone 12. The device administrator may access the mobile phone 12 settings through the application running on the mobile phone 12, with the application providing an authentication layer before allowing access to the interface control application programming interface 36.

In an embodiment, method 200 further comprises the device administrator querying the mobile phone 12 for a current status, wherein the current status comprises the current settings and installed applications. To efficiently manage the settings of the mobile phone 12, the device administrator may query the mobile phone 12 for the current configuration settings, as well as a listing of installed applications.

In an embodiment, the method 200 further comprises the device administrator pushing application updates or removing applications based on the current status of the mobile phone 12. The device administrator may make decisions based on the current status of the mobile phone 12 and make changes to the current settings or installed applications. These changes can then be pushed to the mobile phone 12 and may be in the form of updates to applications or commands to uninstall applications from the mobile phone 12.

In an embodiment, the method 200 further comprises configuring a white list for applications, where an installed application on the white list is approved, and wherein the application remains installed if it is approved. Decisions on changes to the installed applications on the mobile device 12 may be made by comparing the list of installed applications to a white list containing applications approved by the company for use on enterprise devices. If the installed application is on the white list, the application is left on the mobile phone 12. In an embodiment, the method 200 further comprises configuring a black list for applications, wherein an installed application on the black list is not approved, and wherein the application is deleted if it is not approved. The list of installed applications may also be compared against a black list of applications which are not approved by the company for use on enterprise devices. If the installed application is on the black list, the device administrator may push a command to the mobile phone 12 to uninstall and remove the application.

Figure 4:
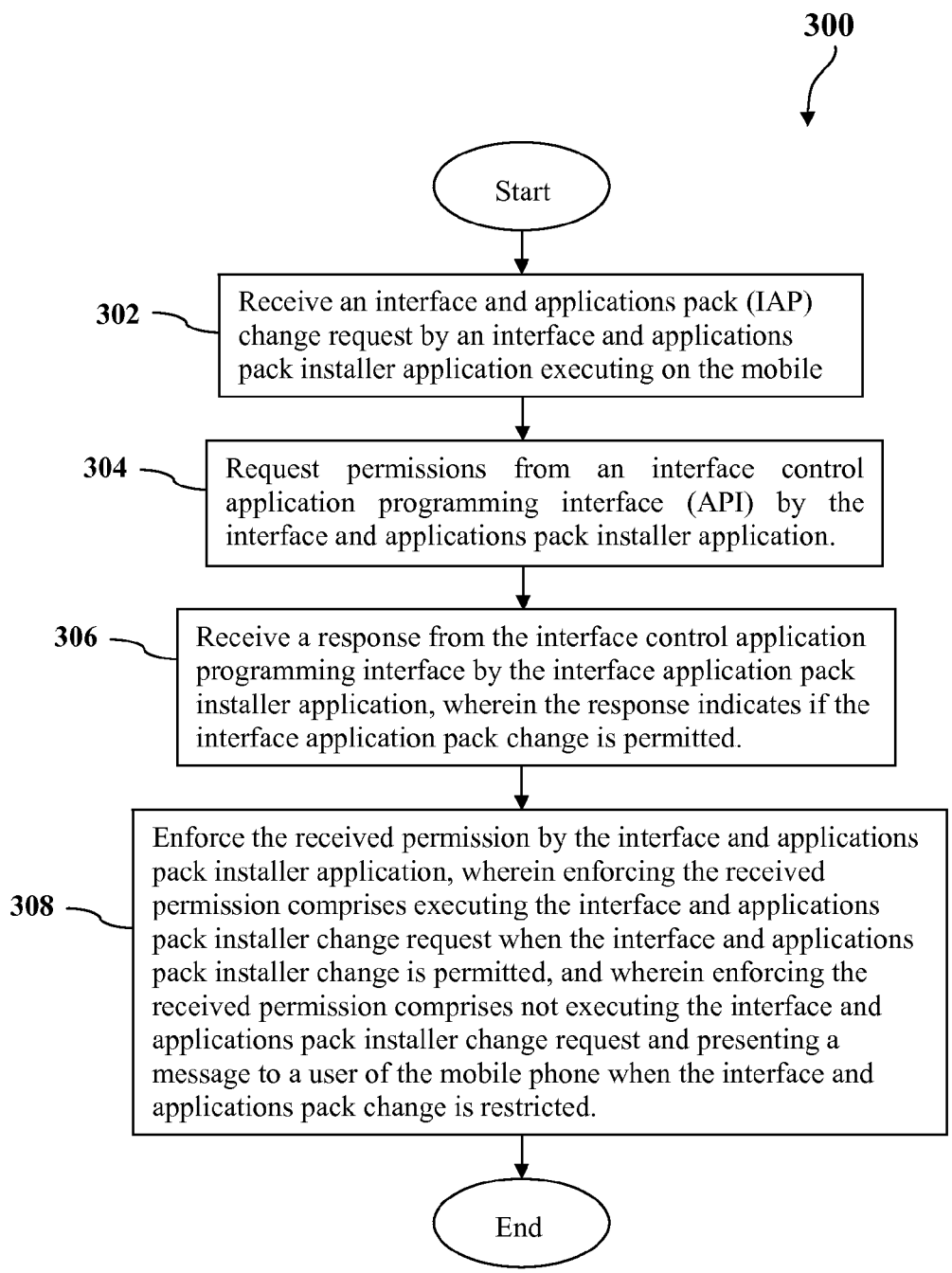
FIG. 4 is a flow chart of a method according to an embodiment of the disclosure.

Turning now to FIG. 4, a method 300 of policy management and control on a mobile phone is described. At block 302, an interface and applications pack change request is received by an interface and applications pack installer application 30 executing on the mobile phone 12. The interface and applications pack installer application 30 is the application which installs, removes, and switches between interface and applications packs based on user requests. The interface and applications pack change request may be in response to the user interacting with a touch screen of the mobile phone 12 or accessing a menu on the mobile phone 12 to attempt to alter the appearance of the interface and applications pack, to change the content of the interface and applications pack, or to remove the interface and applications pack. At block 304, the interface and applications pack installer application 30 requests permissions from an interface control application programming interface 36. The permissions define which interface and applications pack changes are allowed on the mobile device 12.

At block 306, the interface and applications pack installer application 30 receives a response from the interface control application programming interface 36, where the response indicates if the interface and applications pack change is permitted. The interface control application programming interface 36 replies to the permissions check with a true or false indication notifying the interface and applications pack installer application 30 whether to allow the interface and applications pack change. At block 308, the interface and applications pack installer application 30 enforces the received permission, where enforcing the received permission comprises executing the interface and applications pack change request when the interface and applications pack change is permitted, and where enforcing the received permission comprises not executing the interface and applications pack change request and presenting a message to a user of the mobile phone 12 when the interface and applications pack change is restricted.

In an embodiment, the mobile phone 12 comprises a plurality of interface and applications packs, and the permissions are defined separately for each interface and applications pack. Different interface and applications packs may want to limit changes to varying degrees. For example, a corporation may want to provide a single, cohesive experience to users of their interface and applications pack and may restrict users from making changes. Alternatively, a sports web site may encourage the user to customize their interface and applications pack with their favorite team, presenting different statistics, wallpapers, and videos to users based on the user changing the interface and applications pack configuration.

In an embodiment, the method 300 further comprises the interface and applications pack owner defining the permissions for the interface and applications pack. The interface and applications pack owner may be using the interface and applications pack to promote business interests and may therefore want to control the experience presented to the user. This control may be achieved by restricting the changes allowed by permissions installed on the mobile phone 12 and accessed by the interface and applications pack installer application 30 when a user attempts to make a change to the interface and applications pack.

In an embodiment, the permissions for the interface and applications pack are configured when the interface and applications pack is installed on the mobile phone 12. As part of the installation process for the interface and applications pack, the corresponding permissions are configured on the mobile phone 12. This allows the desired control of the interface and applications pack to be in place as soon as the installation is complete. In an embodiment, the permissions for the interface and applications pack are updated periodically. The permissions for the interface and applications pack may be maintained on a server and pushed to the mobile phone 12 whenever a change to the permissions is made. This may enable more flexibility by allowing updates to permission settings on devices which already have the interface and applications pack installed.

Figure 5:
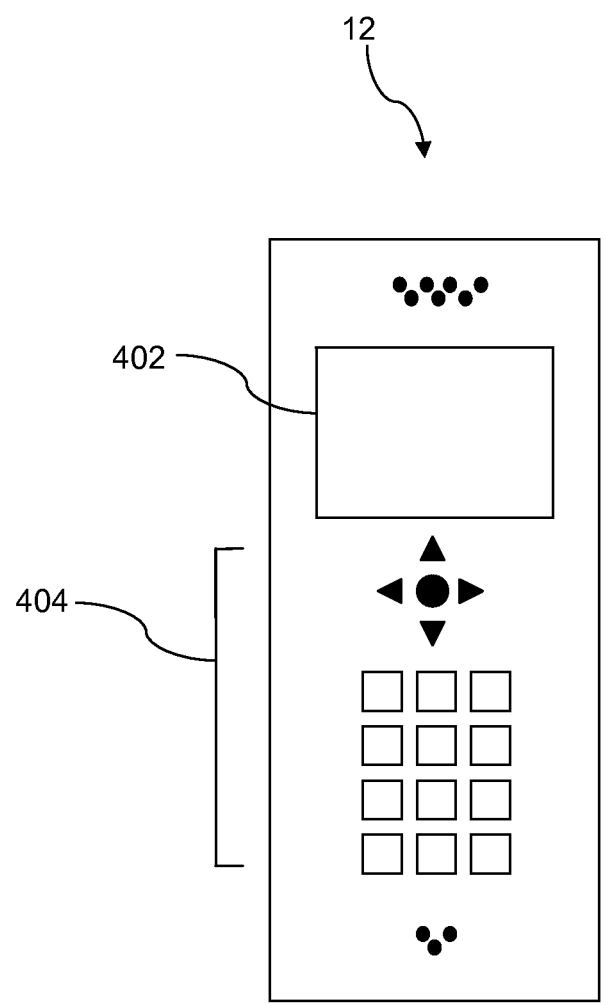
FIG. 5 is an illustration of a mobile device according to an embodiment of the disclosure.

FIG. 5 depicts the mobile device 12, which is operable for implementing aspects of the present disclosure, but the present disclosure should not be limited to these implementations. Though illustrated as a mobile phone, the mobile device 12 may take various forms including a wireless handset, a pager, a personal digital assistant (PDA), a gaming device, or a media player. The mobile device 12 includes a display 402 and a touch-sensitive surface and/or keys 404 for input by a user. The mobile device 12 may present options for the user to select, controls for the user to actuate, and/or cursors or other indicators for the user to direct. The mobile device 12 may further accept data entry from the user, including numbers to dial or various parameter values for configuring the operation of the handset. The mobile device 12 may further execute one or more software or firmware applications in response to user commands. These applications may configure the mobile device 12 to perform various customized functions in response to user interaction. Additionally, the mobile device 12 may be programmed and/or configured over-the-air, for example from a wireless base station, a wireless access point, or a peer mobile device 12. The mobile device 12 may execute a web browser application which enables the display 402 to show a web page. The web page may be obtained via wireless communications with a base transceiver station, a wireless network access node, a peer mobile device 12 or any other wireless communication network or system.

Figure 6:
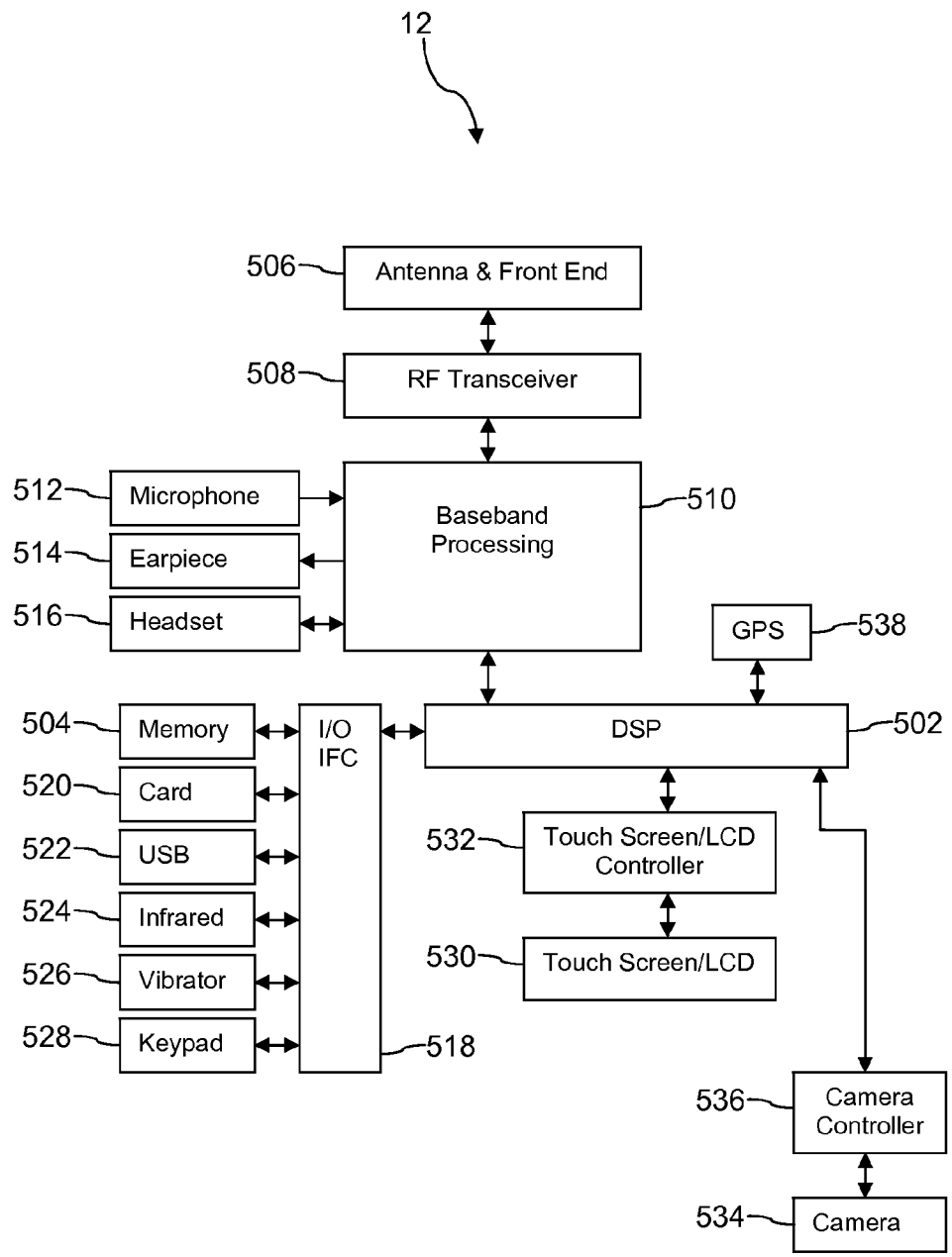
FIG. 6 is a block diagram of a mobile device according to an embodiment of the disclosure.

FIG. 6 shows a block diagram of the mobile device 12. While a variety of known components of handsets are depicted, in an embodiment a subset of the listed components and/or additional components not listed may be included in the mobile device 12. The mobile device 12 includes a digital signal processor (DSP) 502 and a memory 504. As shown, the mobile device 12 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 534, a camera 536, a camera controller 536, and a global positioning system (GPS) receiver 538. In an embodiment, the mobile device 12 may include another kind of display that does not provide a touch sensitive screen. In an embodiment, the DSP 502 may communicate directly with the memory 504 without passing through the input/output interface 518. Additionally, in an embodiment, the mobile device 12 may comprise other peripheral devices that provide other functionality.

The DSP 502 or some other form of controller or central processing unit operates to control the various components of the mobile device 12 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 12 to function as a peripheral device to exchange information with a personal computer or other computer system. The infrared port 524 and other optional ports such as a Bluetooth® interface or an IEEE 802.11 compliant wireless interface may enable the mobile device 12 to communicate wirelessly with other nearby handsets and/or wireless base stations.

The keypad 528 couples to the DSP 502 via the interface 518 to provide one mechanism for the user to make selections, enter information, and otherwise provide input to the mobile device 12. Another input mechanism may be the touch screen LCD 530, which may also display text and/or graphics to the user. The touch screen LCD controller 534 couples the DSP 502 to the touch screen LCD 530. The GPS receiver 538 is coupled to the DSP 502 to decode global positioning system signals, thereby enabling the mobile device 12 to determine its position.

Figure 7A:
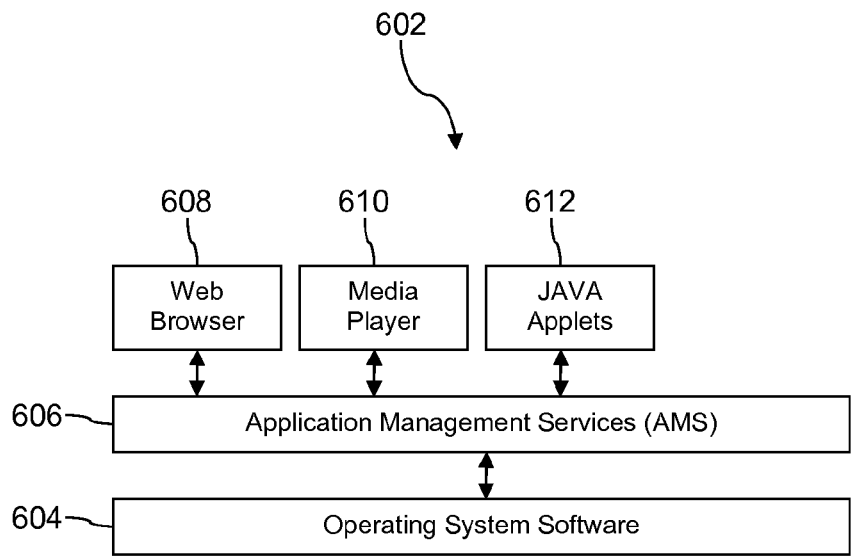
FIG. 7A is a block diagram of a software architecture for a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 12. Also shown in FIG. 7A are a web browser application 608, a media player application 610, and JAVA applets 612. The web browser application 608 may be executed by the mobile device 12 to browse content and/or the Internet, for example when the mobile device 12 is coupled to a network via a wireless link. The web browser application 608 may permit a user to enter information into forms and select links to retrieve and view web pages. The media player application 610 may be executed by the mobile device 12 to play audio or audiovisual media. The JAVA applets 612 may be executed by the mobile device 12 to provide a variety of functionality including games, utilities, and other functionality.

Figure 7B:
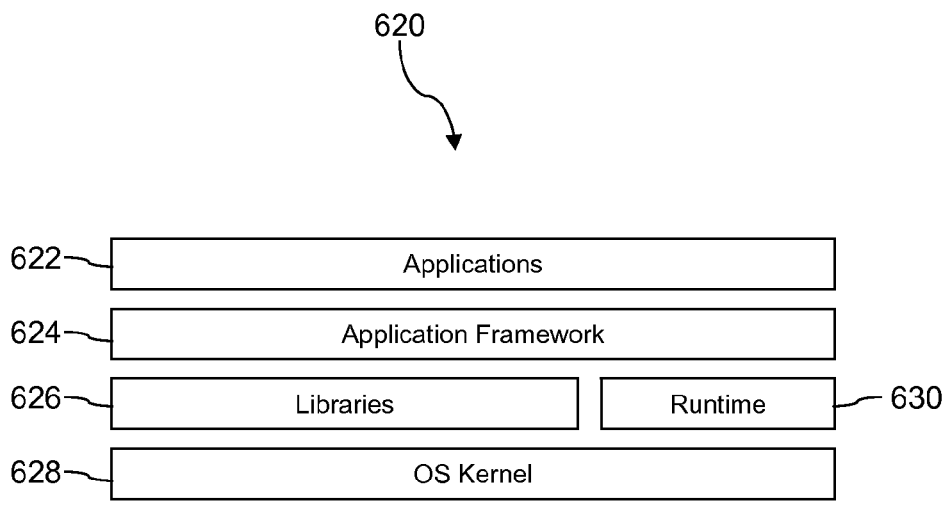
FIG. 7B is a block diagram of a software architecture for a mobile device according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
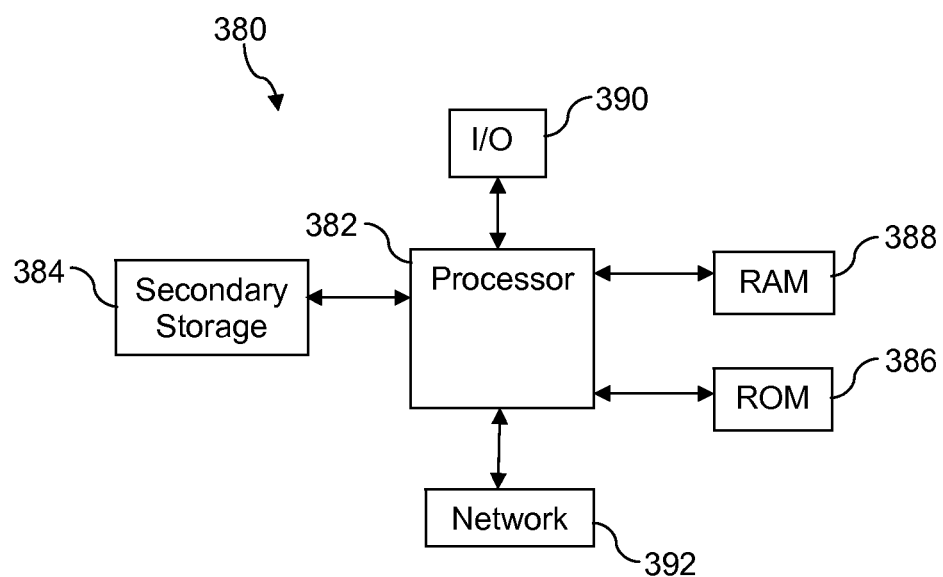
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of policy management and control on a mobile phone, comprising:

receiving, by a launcher application executing on the mobile phone, a user interface change request to change a user interface of the mobile phone, the user interface comprising one or more panels and the one or more panels comprising a plurality of cells, wherein the user interface change request comprises one of adding, deleting, or rearranging user interface elements, changing wallpaper, invoking a search, or opening a settings menu, and wherein the user interface elements comprise shortcuts, widgets, and folders;

requesting, by the launcher application, permissions from an interface control application programming interface (API), wherein the permissions comprise one or more context based permissions based on at least one of a time of day, a day of week, a geographic location, or a relative location;

receiving, by the launcher application, a response from the interface control application programming interface, wherein the response indicates whether the user interface change is permitted;

enforcing, by the launcher application, the received permission, wherein enforcing the received permission comprises executing the user interface change request in response to the user interface change being permitted, and wherein enforcing the received permission comprises not executing the user interface change request and presenting a message to a user of the mobile phone in response to the user interface change being restricted;

sending, by the mobile phone, current settings of the mobile phone and installed applications on the mobile phone to an administration server; and receiving, by the mobile phone, updated permissions and applications.

2. The method of claim 1, wherein the permissions are based on at least one of the user interface elements.

3. The method of claim 1, wherein the permissions are based on one of a panel location or a cell location on the user interface.

4. The method of claim 1, wherein the user interface elements occupy one or more cells on the panel, and wherein rearranging the user interface elements comprises moving the user interface element to another panel.

5. The method of claim 1, further comprising pushing initial permissions and updates to permissions to the launcher application from the interface control application programming interface.

* * * * *